(12) United States Patent
Marks et al.

(10) Patent No.: US 7,886,696 B2
(45) Date of Patent: Feb. 15, 2011

(54) HOME AQUARIUM

(75) Inventors: Neil H. Marks, Ra'anana (IL); Eli Nissemberg, Ramat Hasharon (IL); Sharon Ram, Rehovot (IL)

(73) Assignee: Red Sea Fish Pharm Ltd., Herzliya (IL)

(*) Notice: Subject to any disclaimer, the term of this patent is extended or adjusted under 35 U.S.C. 154(b) by 166 days.

(21) Appl. No.: 12/226,907

(22) PCT Filed: May 2, 2007

(86) PCT No.: PCT/IL2007/000536
§ 371 (c)(1),
(2), (4) Date: Oct. 31, 2008

(87) PCT Pub. No.: WO2007/129307
PCT Pub. Date: Nov. 15, 2007

(65) Prior Publication Data
US 2009/0229533 A1    Sep. 17, 2009

Related U.S. Application Data

(60) Provisional application No. 60/796,888, filed on May 3, 2006.

(51) Int. Cl.
*A01K 63/00* (2006.01)
(52) U.S. Cl. .............. 119/260; 119/248; 119/266
(58) Field of Classification Search ............ 119/245, 119/248, 259–264, 266, 269; 210/167.21, 210/167.23, 167.24, 416.2
See application file for complete search history.

(56) References Cited

U.S. PATENT DOCUMENTS

| | | | | |
|---|---|---|---|---|
| 2,776,642 A | * | 1/1957 | Sepersky | 119/263 |
| 3,149,608 A | * | 9/1964 | Murphy | 119/253 |
| 3,387,587 A | * | 6/1968 | Smith et al. | 119/211 |
| 3,557,753 A | * | 1/1971 | Dantoni | 119/260 |
| 3,661,262 A | | 5/1972 | Sanders | |
| 3,720,318 A | | 3/1973 | Cohen | |
| 3,850,806 A | | 11/1974 | Cohen | |
| 3,957,017 A | | 5/1976 | Carmignani et al. | |

(Continued)

FOREIGN PATENT DOCUMENTS

GB    2 239 402 A    7/1991

(Continued)

*Primary Examiner*—Rob Swiatek
*Assistant Examiner*—Ebony Evans
(74) *Attorney, Agent, or Firm*—Abraham Hershkovitz; Harold L. Novick; Hershkovitz & Associates, LLC

(57) ABSTRACT

Closed top home aquarium for setting up and maintaining a sea water aquatic environment in particular. The aquarium includes a transparent open topped box-like enclosure, a compartment integrally formed with and behind the box-like enclosure, and a hinged dual position fan cooled hood. The compartment includes a water circulation system and a multistage filtration system. The hood includes a lighting system for daytime and nighttime illumination, and a built-in 24 programmable timer. The aquarium includes a thermostat controlled water temperature system and a below water level splash proof power center for safely and aesthetically connecting all electrical aquarium components to a mains electricity outlet. Home aquariums can be provided with an integrally formed below water level splash proof power center for use with off-the-shelf electrical aquarium appliances.

10 Claims, 12 Drawing Sheets

U.S. PATENT DOCUMENTS

| | | | |
|---|---|---|---|
| 4,004,551 A * | 1/1977 | Kato | 119/260 |
| 4,029,050 A * | 6/1977 | Genest | 119/201 |
| 4,606,821 A * | 8/1986 | D'Imperio | 210/167.22 |
| 4,844,013 A * | 7/1989 | de Haan et al. | 119/248 |
| 4,863,594 A | 9/1989 | Pedretti | |
| 4,988,436 A | 1/1991 | Cole | |
| 5,078,867 A | 1/1992 | Danner | |
| 5,084,164 A | 1/1992 | Del Rosario | |
| 5,160,853 A | 11/1992 | Simon et al. | |
| 5,171,438 A * | 12/1992 | Korcz | 210/167.22 |
| 5,172,650 A * | 12/1992 | Hsu et al. | 119/259 |
| 5,299,424 A | 4/1994 | Woodson et al. | |
| 5,306,421 A * | 4/1994 | Weinstein | 210/151 |
| 5,408,955 A * | 4/1995 | Tsuchiya | 119/266 |
| 5,427,060 A * | 6/1995 | Kikuta | 119/248 |
| 5,628,905 A | 5/1997 | Montalbano | |
| 5,667,671 A | 9/1997 | Munsch et al. | |
| 6,561,135 B1 | 5/2003 | Creech, Sr. et al. | |
| 6,849,189 B2 | 2/2005 | Curlee et al. | |
| 6,869,530 B1 | 3/2005 | Venezia | |
| 7,094,335 B2 | 8/2006 | Patron | |

FOREIGN PATENT DOCUMENTS

| | | | |
|---|---|---|---|
| JP | 9-308409 | * | 9/1997 |

* cited by examiner

HOME AQUARIUM

CROSS-REFERENCE TO RELATED APPLICATIONS

This application is the United States National Stage filing of PCT Application PCT/I12007/000536 having an international filing date of May 2, 2007, which application is incorporated herein in its entirety by reference; said PCT Application claims priority on U.S. Provisional Application Ser. No. 60/796,888 filed May 3, 2006, which application is also incorporated herein in its entirety by reference.

FIELD OF THE INVENTION

The invention pertains to home aquariums.

BACKGROUND OF THE INVENTION

Reef aquariums contain live corals and other animals associated with coral reefs and are generally recognized to be the most challenging type of home aquariums to set up and maintain. Online information regarding reef aquariums is available at http://en.wikipedia.org/wiki/Reef_aquarium. Reef aquariums include inter alia a transparent glass or plastic open topped box-like enclosure for housing an aquatic environment, a water circulation system for circulating aquarium water at a suitable water turnover rate, a lighting system, a water temperature system for maintaining water temperature between 24 and 28° C. without radical temperature shifts, and a filtration system for maintaining biological load at acceptable levels. Hobbyists have hitherto selected off-the-shelf electrical aquarium appliances to set up reef aquariums which are often insufficiently synergetic to grow and maintain a healthy coral reef environment. Moreover, the electrical aquarium appliances are typically inaccessibly deployed behind, adjacent or under an aquarium for aesthetic reasons and often result in an unsightly, confusing and potentially dangerous tangle of power cords connected to a nearby mains electrical outlet for power purposes.

SUMMARY OF THE INVENTION

The present invention is for home aquariums for setting up and maintaining aquatic environments in general and sea water aquatic environments in particular. The first aspect of the present invention is directed toward a closed top home aquarium for setting up and maintaining a sea water aquatic environment. The aquarium includes a transparent open topped box-like enclosure, a compartment integrally formed with and behind the box-like enclosure, and a hinged dual position fan cooled hood. The compartment includes a water circulation system for circulating aquarium water at a desired water turnover rate and a multistage filtration system for filtering aquarium water to required biological loads. The multistage filtration system includes at least a mechanical filter, a protein skimmer, biological filter media and chemical filter media. The filtration system can optionally include a UV filter, an ozonizer, a calcium reactor, a de-nitrification unit, and the like. The hood includes a lighting system for daytime and nighttime illumination, and a built-in 24 programmable timer for setting photoperiods and moonlight periods. The aquarium includes a thermostat controlled water temperature system for maintaining aquarium water between 24 and 28° C. and preferably includes a below water level splash proof power center for safely and aesthetically connecting all electrical aquarium components to a mains electricity outlet. The aquarium satisfies International Safety Standards EN 60335-2-55 and EN 60598-2-11 together with affording an overall aesthetic appearance. The second aspect of the present invention is directed towards home aquariums including an integrally formed below water level splash proof power center for use with off-the-shelf electrical aquarium appliances, for example, a circulation pump, a heater, and the like.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE PRESENT INVENTION

Figure 1:
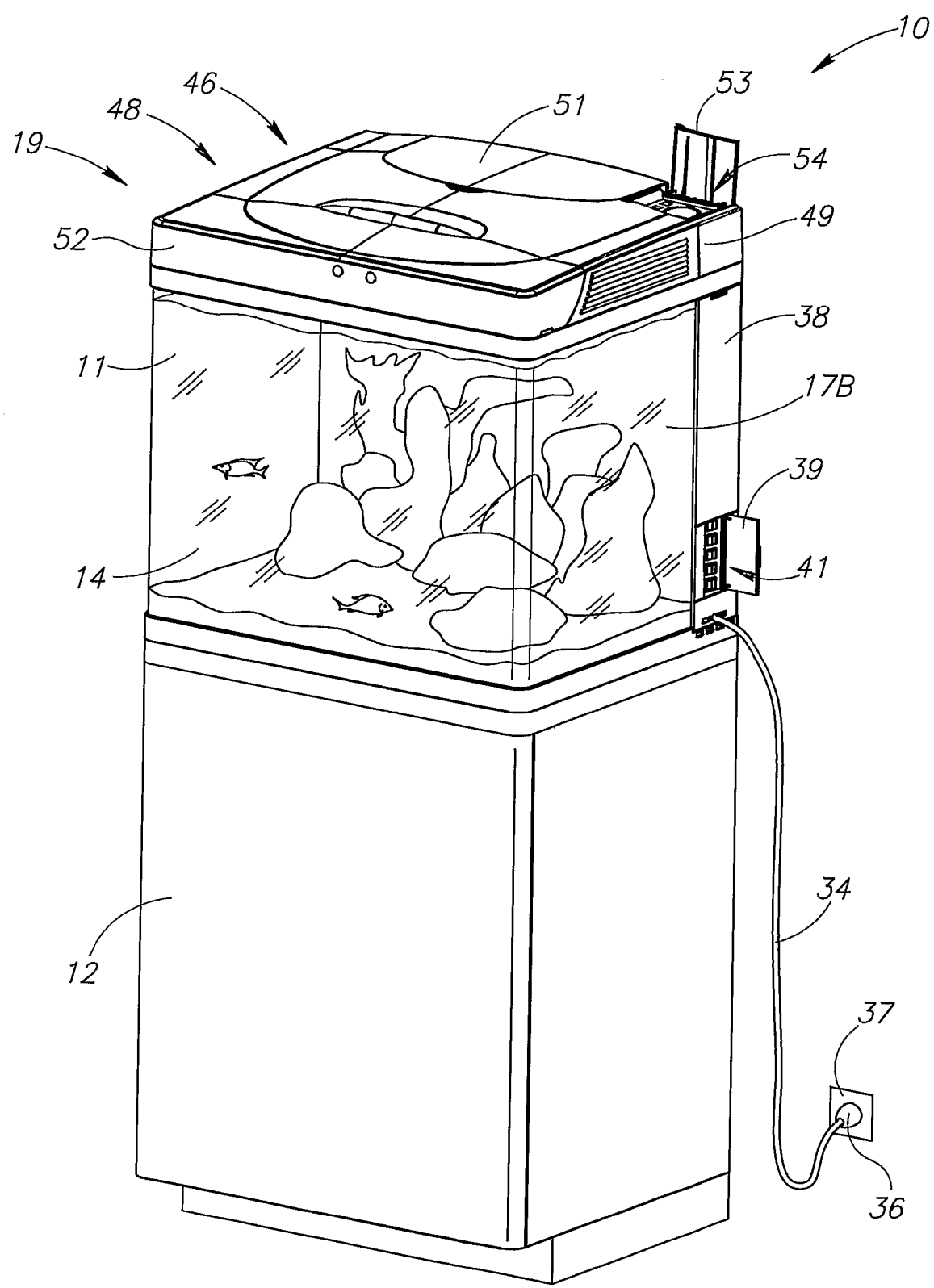
FIG. 1 is a pictorial view showing a closed top home aquarium including a box-like enclosure mounted on an aquarium stand and a hinged dual position fan cooled hood in a closed position.
Figure 2:
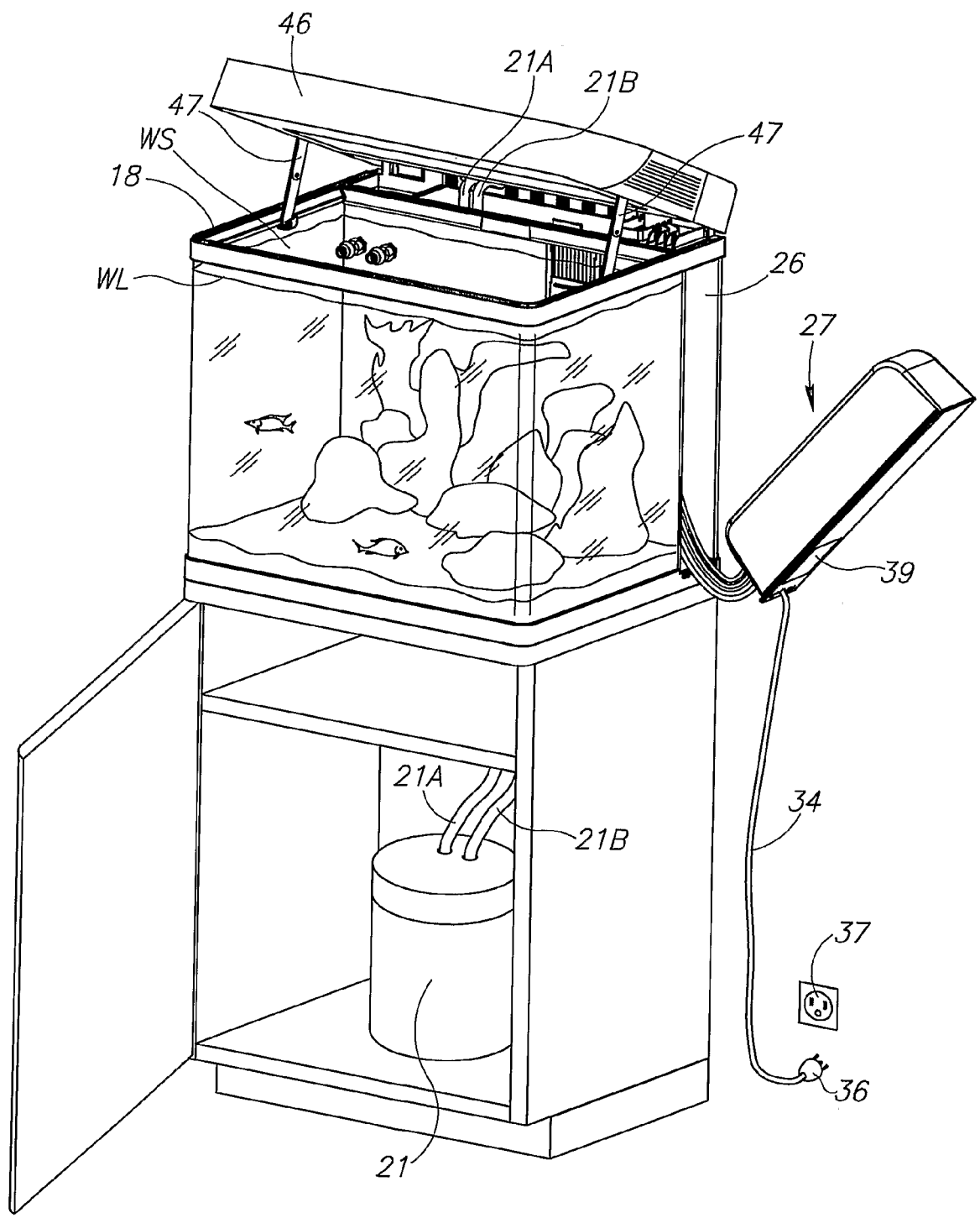
FIG. 2 is a pictorial view showing the home aquarium with its hood in an open position for enabling aquascaping and maintenance, and a splash proof power center removed from a side compartment.
Figure 3:
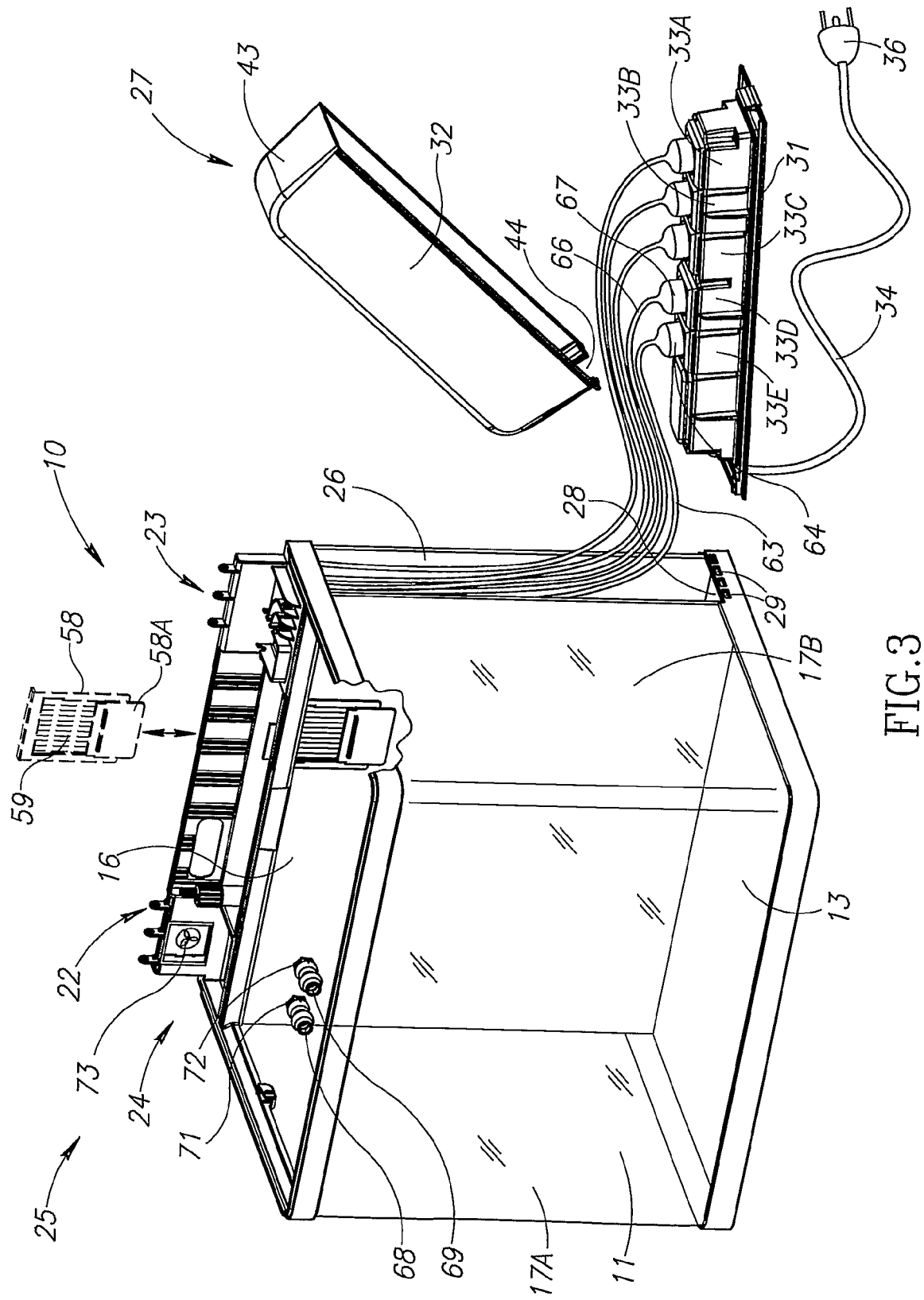
FIG. 3 is a pictorial view showing the box-like enclosure's rear wall with a filter comb.

FIGS. 1 to 3 show a closed top home aquarium 10 including an open topped 8 mm thick transparent glass box-like enclosure 11 mounted on an aquarium stand 12. The box-like enclosure 11 includes a base 13, a front wall 14, a rear wall 16, left and right side walls 17A and 17B, and an enclosure rim 18. The box-like enclosure 11 houses a sea water aquatic environment including a volume of aquarium water having a water surface WS with a recommended water level WL. The sea water aquatic environment is preferably intended to be a coral reef environment including corals, fish, and the like. The aquarium 10 includes a thermostatically controlled water temperature system 19 for maintaining aquarium water within a predetermined temperature range. The optimal temperature range for coral reef environments is between 24 and 28° C. The water temperature system 19 optionally includes a thermostatically controlled cooler unit 21 with inlet and outlet tubes 21A and 21B in warmer climates where the ambient temperature is above the maximum recommended. The cooler unit 21 is preferably stored in the aquarium stand 12.

The aquarium 10 includes a major compartment 22 and a minor side compartment 23 integrally formed with the box-like enclosure 11 behind the rear wall 16. The major compartment 22 and the side compartment 23 are substantially co-extensive widthwise and height wise with the rear wall 16. The major compartment 22 houses a water circulation system 24 for circulating aquarium water from the box-like enclosure 11 into the major compartment 22 and back into the box-like enclosure 11 at a desired water turnover rate in the region of about ten times per hour. The major compartment 22 also includes a multistage filtration system 25 for maintaining aquarium water within acceptable levels in terms of biological load, and the like. The side compartment 23 includes an elongated opening 26 flush with the right side wall 17B. The side compartment 23 houses a splash proof power center 27 in an upright position below the recommended water line WL. The side compartment 23 includes a lowermost surface 28 and drainage holes 29 for water runoff.

The power center 27 includes an electrical connection box 31 and a splash cover 32 for sealingly mounting on the connection box 31. The connection box 31 includes five electrical sockets 33A-33E connected to single power cord 34 with an electricity plug 36 for plugging into a mains electricity outlet 37 for powering electrical aquarium components for setting up and maintaining the aquatic environment. The connection box 31 includes a base surface 38 substantially flush with the right side wall 17B on insertion of the power center 27 in the side compartment 23. The base surface 38 includes a hinged cover 39 for revealing a main control panel 41 with power switches 42A-42E corresponding to the sockets 33A-33E. The power switches 42A-42E are preferably labeled with different electrical aquarium components as described below with reference to FIG. 7. The splash cover 32 includes an uppermost curved surface 43 such that water entering the side compartment 23 from above splashes onto the curved surface 43 and runs down the splash cover 32 for drainage through the drainage holes 29. The splash cover 32 includes a lowermost power cord access aperture 44 for enabling entry of power cords from electrical aquarium components for setting up and maintaining the home aquarium 10 into the power center 27.

The home aquarium 10 includes a hinged dual position fan cooled hood 46 with a pair of hinged hood supports 47 for enabling the hood 46 to be deployed between a closed position for preventing aquarist access to the box-like enclosure 11 and the compartments 22 and 23, and an open position for enabling aquarist access to aquascape the aquatic environment and maintain the filtration system 25. The hood 46 includes a lighting system 48 for daytime and nighttime illuminating the aquatic environment, and a cooling fan 49 for cooling the hood 46. The hood 46 includes a hinged center flap 51, a hinged full width front opening 52, and a hinged cover 53 for manually swinging open to reveal a hood control panel 54. The hood 46 includes a power cord 56 with an electricity plug 57 for plugging into the power center 27 (see FIG. 6).

The rear wall 16 has a rectangular inlet 58 for slidingly receiving a mechanical filter comb 59 for mechanical filtering aquarium water. The inlet 58 includes a slidable shutter 58A. The water circulation system 24 includes a pair of circulation pumps 61 and 62 deployed in the compartment 22 behind the rear wall 16 (see FIG. 4). The circulation pump 61 has a power cord 63 with an electricity plug 64 for plugging into the power center 27. The circulation pump 62 has a power cord 66 with an electricity plug 67 for plugging into the power center 27.

The circulation pumps 61 and 62 respectively have adjustable direction outlets 68 and 69 protruding through bores 71 and 72 in the rear wall 16 for returning filtered water to the box-like enclosure 11. The outlets 68 and 69 are preferably directionally adjustable to suit different aquascapes and invertebrate positions, and for "breaking" the water surface for promoting gas exchange and preventing the accumulation of bio-film which reduces light penetration. The water temperature system 19 includes a water cooling fan 73 for blowing air across the water surface WS. The water cooling fan 73 is capable of cooling aquarium water by about 3-4° C. by evaporation depending on ambient temperature.

Figure 4:
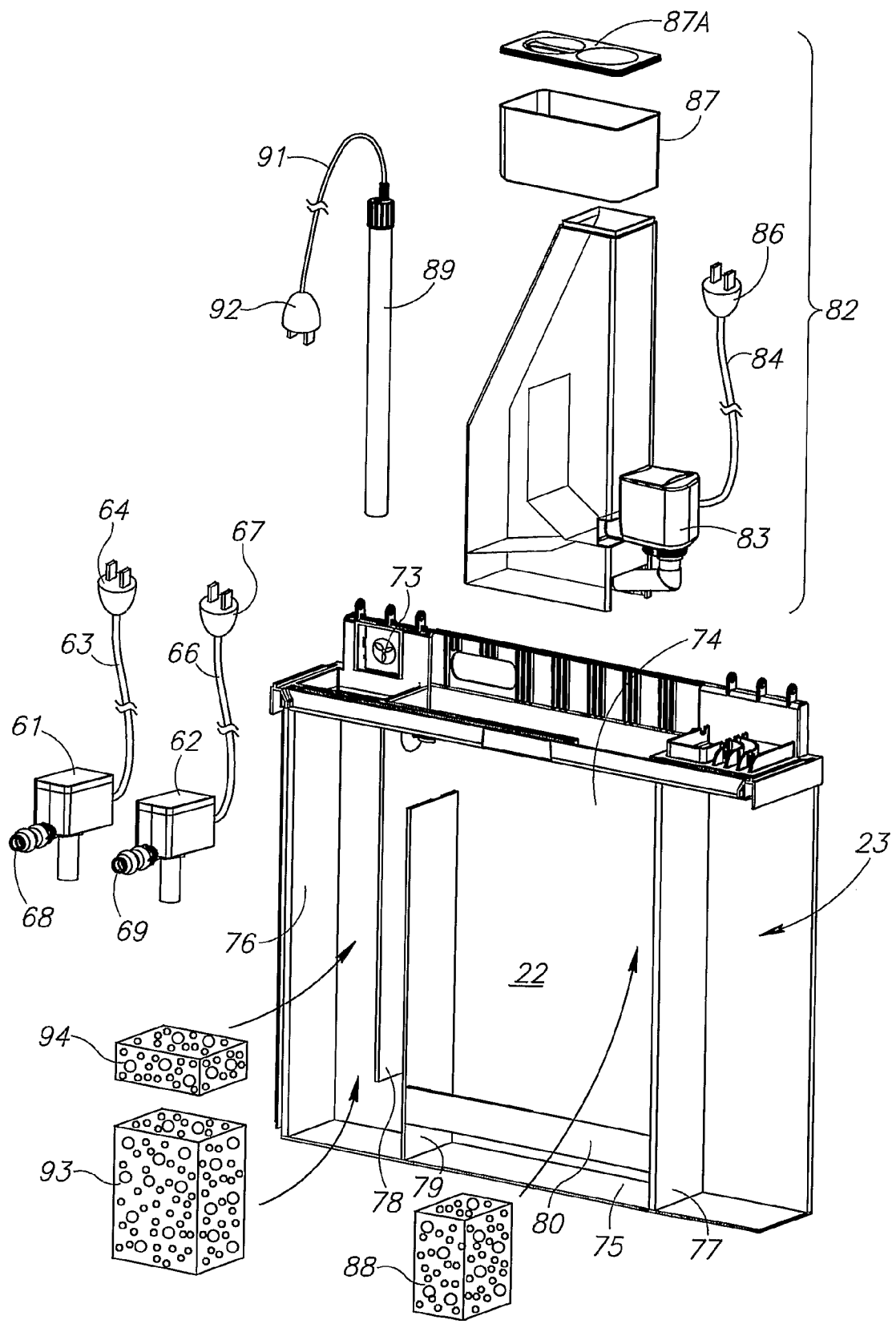
FIG. 4 is an exploded view of the home aquarium.
Figure 5:
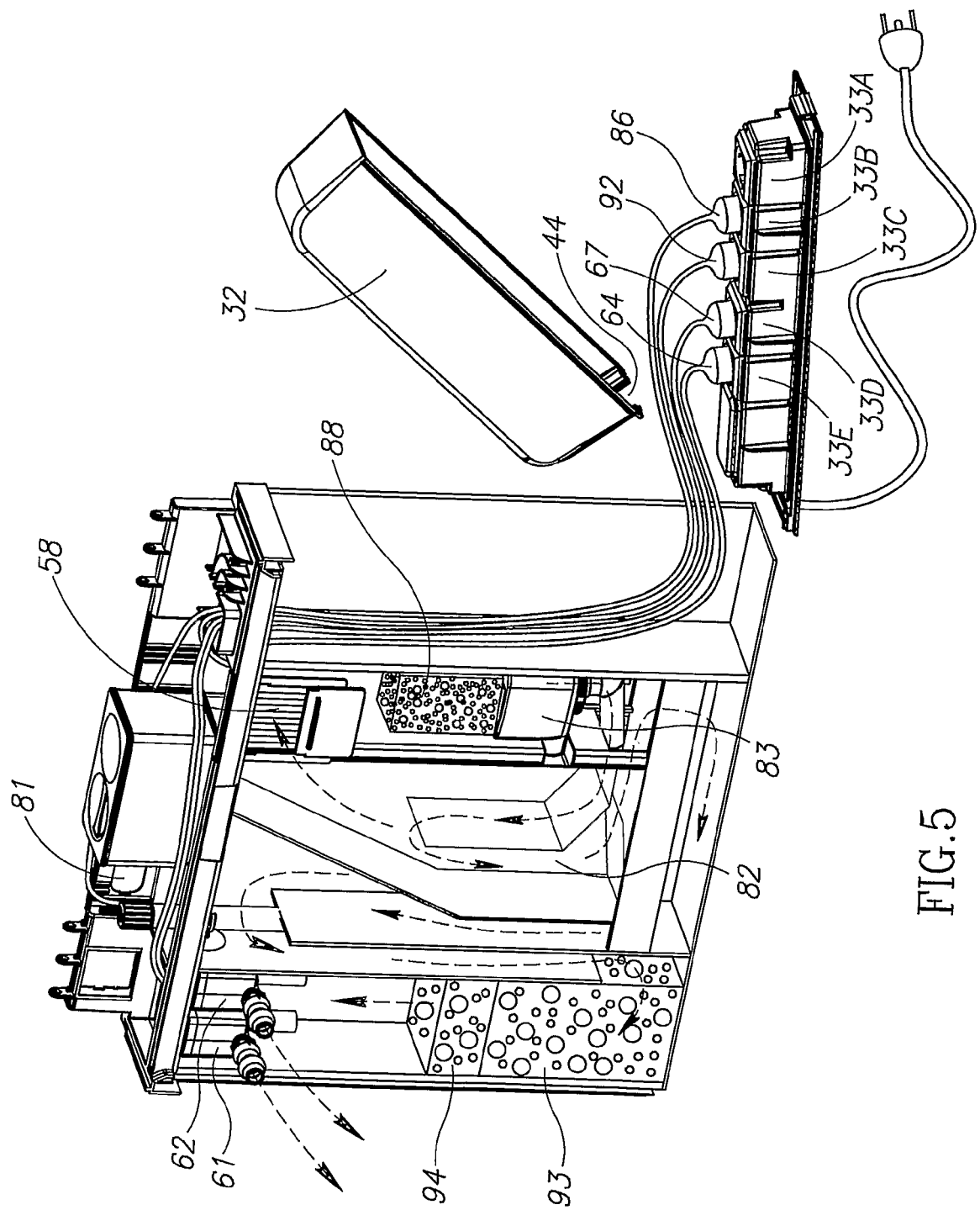
FIG. 5 is a cut away assembled view of the home aquarium with its electrical aquarium components plugged into the splash proof power center.

FIGS. 4 and 5 show the compartments 22 and 23 are formed by a rear glass plate 74 spaced behind the rear wall 16, a base 75 extending from the base 13, an upright leftmost spacer 76 extending from the left side wall 17A, an upright rightmost spacer 77 and two upright central spacers 78 and 79. The central spacer 78 stops above the base 75. The central spacer 79 extends upwards from the base 75 and is shorter than the leftmost spacer 76 and the rightmost spacer 77. The rightmost spacer 77 and the central spacer 79 support a horizontal support 80 above the base 75. The glass plate 74 includes a removable access panel 81 for chiller inlet/outlet tubes 21A and 21B.

The filtration system 25 includes a protein skimmer 82 supported on the support 80 and juxtaposed against the rightmost spacer 77 to leave an upright space between the protein skimmer 82 and the central spacer 79. The protein skimmer 82 includes a turbo air injected skimmer pump 83 having a power cord 84 with an electricity plug 86 for plugging into the power center 27, and a manual removable foam collection cup 87 accessible via the center flap 51 in the hood's closed position. Mechanical filter sponges 88 are deployed in the space between the protein skimmer 82 and the rightmost spacer 77 above the skimmer pump 83. The water temperature system 19 can include a thermostatic controlled heater 89 deployed upright between the spacers 78 and 79. The heater 89 includes a power cord 91 with an electricity plug 92 for plugging into the power center 27. The filtration system 25 includes biological filter media 93 and chemical filter media 94 between the leftmost spacer 76 and the spacer 78 under the circulation pumps 61 and 62. Chemical filter media 94 can be constituted by activated carbon, and the like.

The passage of aquarium water through the compartment 22 and the filtration system 25 is as follows: Aquarium water flows into the compartment 22 through the filter comb 59 and downward through the mechanical filter sponge 88 towards the skimmer pump 83. The skimmer pump 83 pumps aquarium water into the protein skimmer 82 for removal of biological load and returns protein free aquarium water to the downward flow of aquarium water. The skimmer pump 83 effectively pumps a mixture of protein laden aquarium water and protein free aquarium water into the protein skimmer 82. Aquarium water flows under the protein skimmer 82 and upwards between the protein skimmer 82 and the central spacer 79. Aquarium water flows over the central spacer 79 and downwards between the central spacers 78 and 79. Aquarium water flows under the central spacer 78 and upwards through the biological filter media 93 and chemical filter media 94 towards the circulation pumps 61 and 62 for returning to the box-like enclosure 11.

Figure 6:
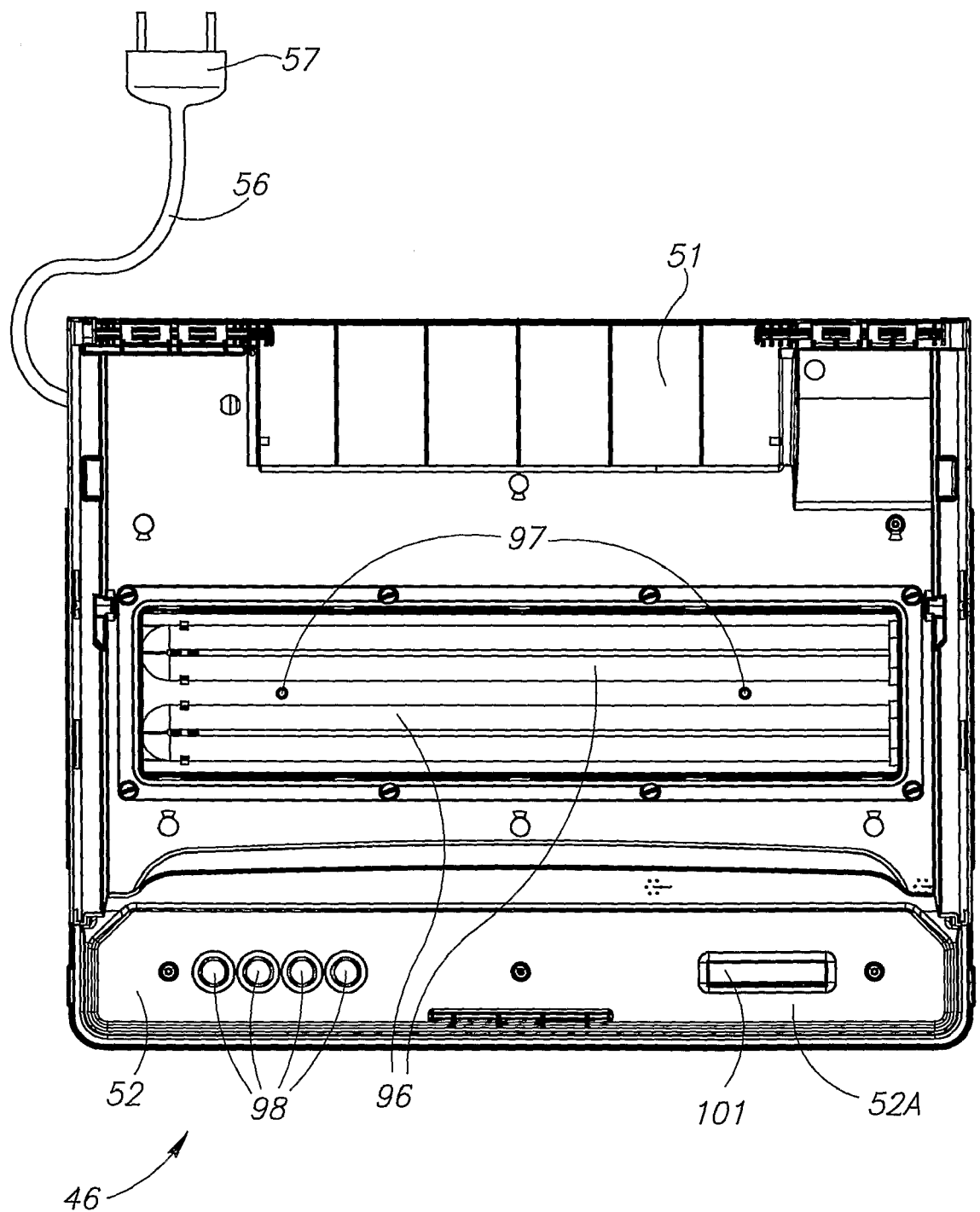
FIG. 6 is a bottom view of the hood.

FIG. 6 shows the lighting system 48 includes white fluorescent tubes 96 for daylight illumination of the home aquarium 10, and a pair of blue LEDs 97 for moonlight illumination during nighttime illumination. The lighting system 48 illuminates aquarium water with a so-called color temperature of about 10,000 degrees Kelvin for daytime illumination providing about 1 watt per liter of clear blue sky color with an about 1:1 ratio of pure actinic blue. The front opening 52 has an underside 52A formed with blind bores 98 for receiving test tubes 99 and an elongated aperture 101 for receiving a hydrometer, and folds back to provide a stable work surface (see FIG. 11).

Figure 7:
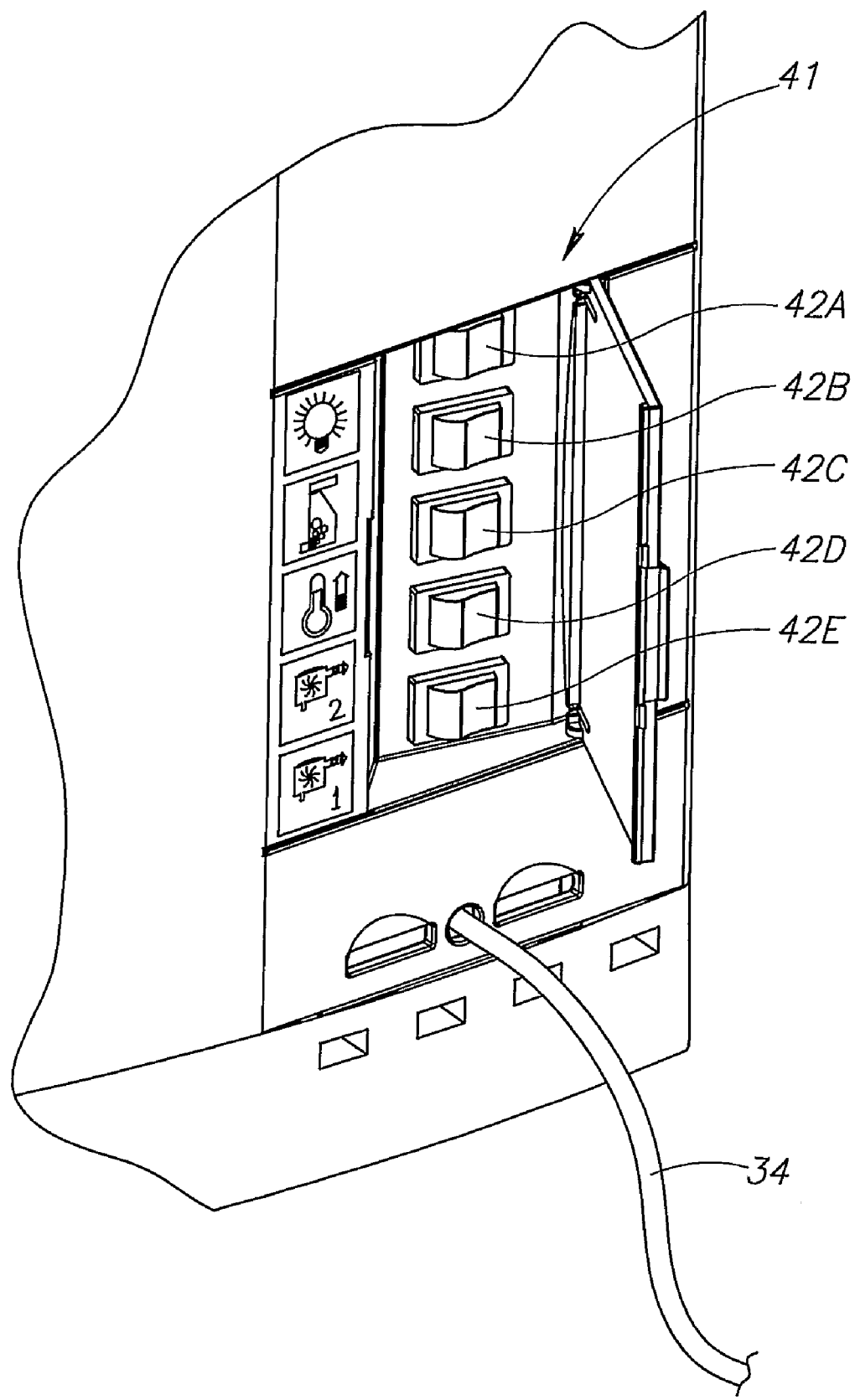
FIG. 7 is a close-up view of the main control panel.

FIG. 7 shows the main control panel 41 has five switches 42A-42E labeled HOOD, SKIMMER, WATER TEMPERATURE SYSTEM, PUMP 1, PUMP 2, respectively operating the power sockets 33A-33E.

Figure 8:
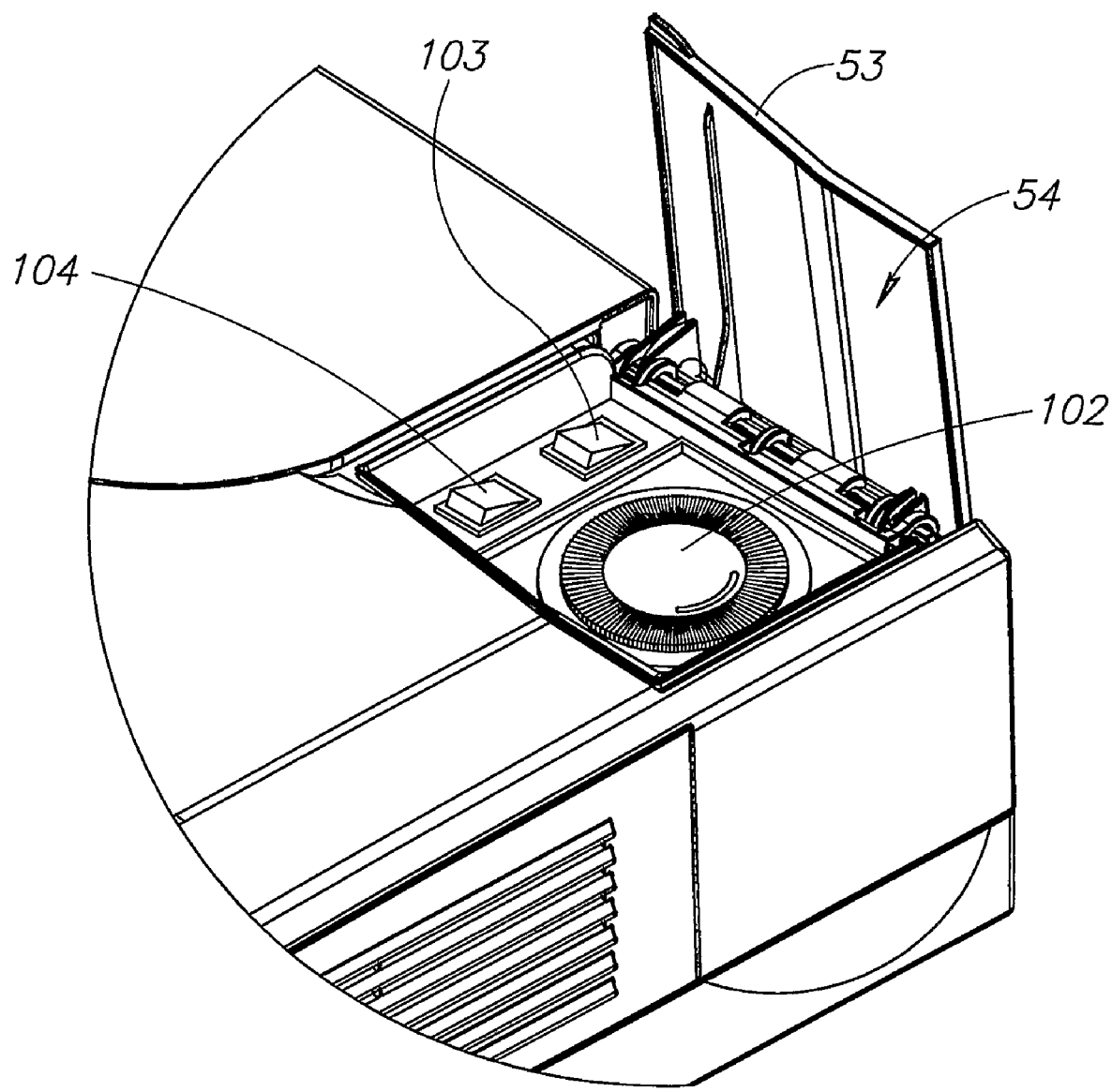
FIG. 8 is a close-up view of the hood control panel.

FIG. 8 shows the hood control panel 54 includes a 24 h programmable timer 102 with integral on/off/auto switch for controlling the white fluorescent lighting 96, an ON/OFF switch 103 for controlling the LED moonlights 97, and an ON/OFF switch 104 for controlling the cooling fan 49.

Figure 9:
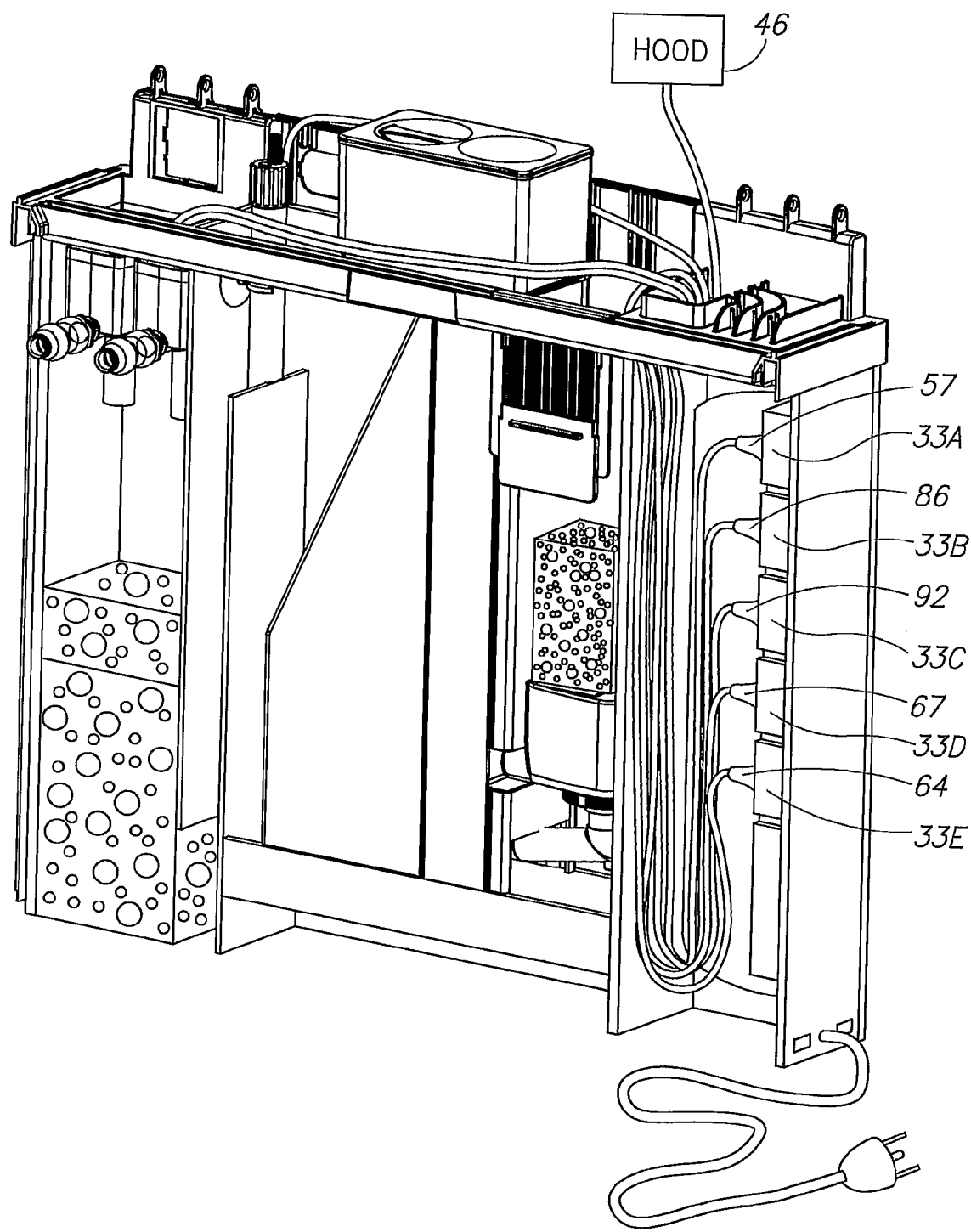
FIG. 9 is a cut away assembled view of the home aquarium with its splash proof power center inserted into its side compartment.

FIG. 9 shows the electrical aquarium components' power cords lying across the compartment 22 and extending downwards into the side compartment 23 from above before looping upwards to enter the power center 27 through the power cord access aperture 44 thereby forming drip loops such that any water will drain through the drainage holes 29. The hood's plug 57 is plugged into the socket 33A operated by the power switch 42A. The skimmer pump's plug 86 is plugged into the socket 33B operated by the power switch 42B. The heater's plug 92 is plugged into the socket 33C operated by the power switch 42C. The circulation pump's plug 64 is plugged into the socket 33D operated by the power switch 42D. The circulation pump's plug 67 is plugged into the socket 33E operated by the power switch 42E.

Figure 10:
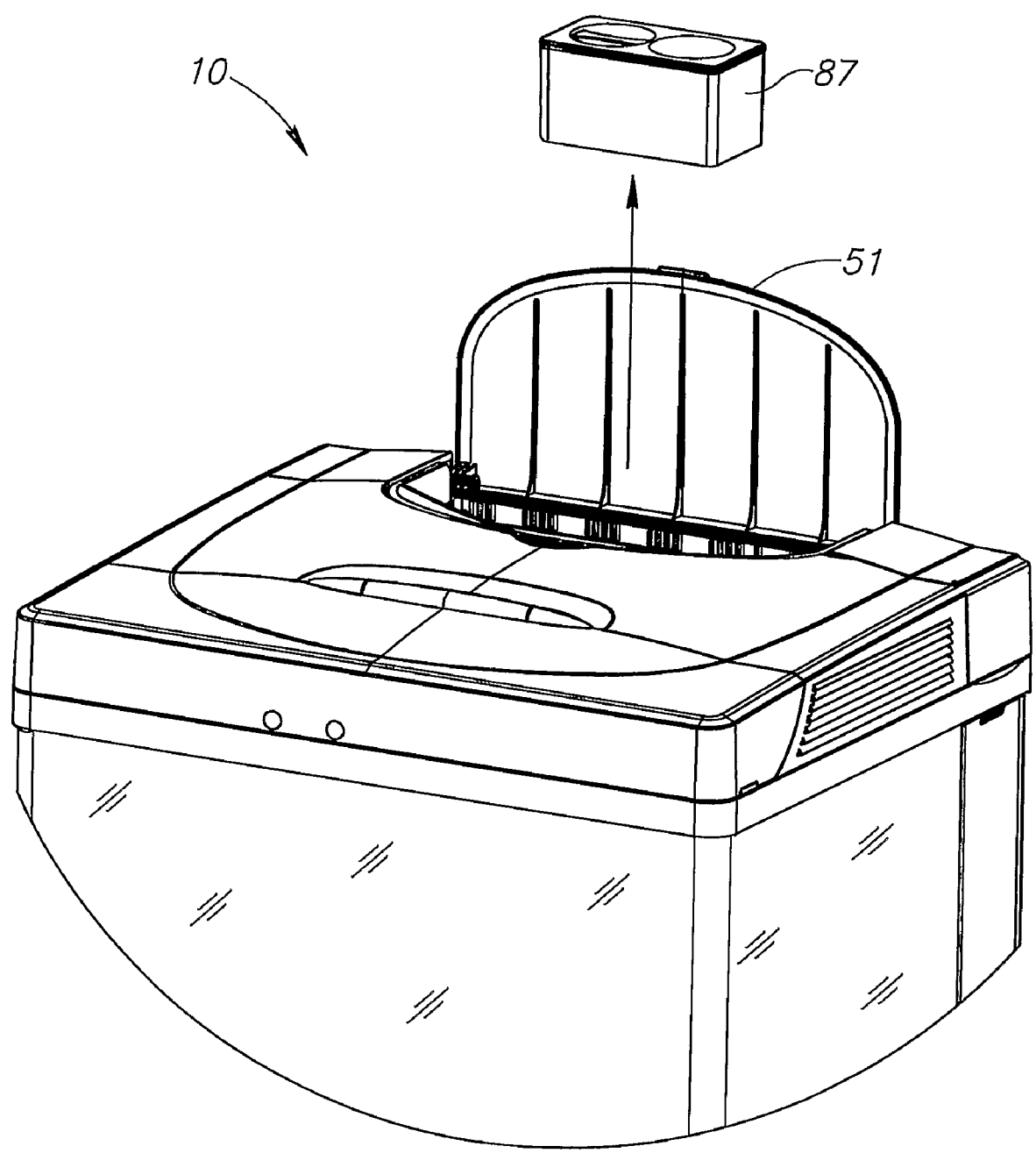
FIG. 10 is a pictorial view showing the home aquarium with its center open flap in an open position for enabling removal of a foam collection cup.

FIG. 10 shows the home aquarium 10 with its center flap 51 open for easy viewing and maintenance of the protein skimmer 82 including removal of its foam collection cup 87.

Figure 11:
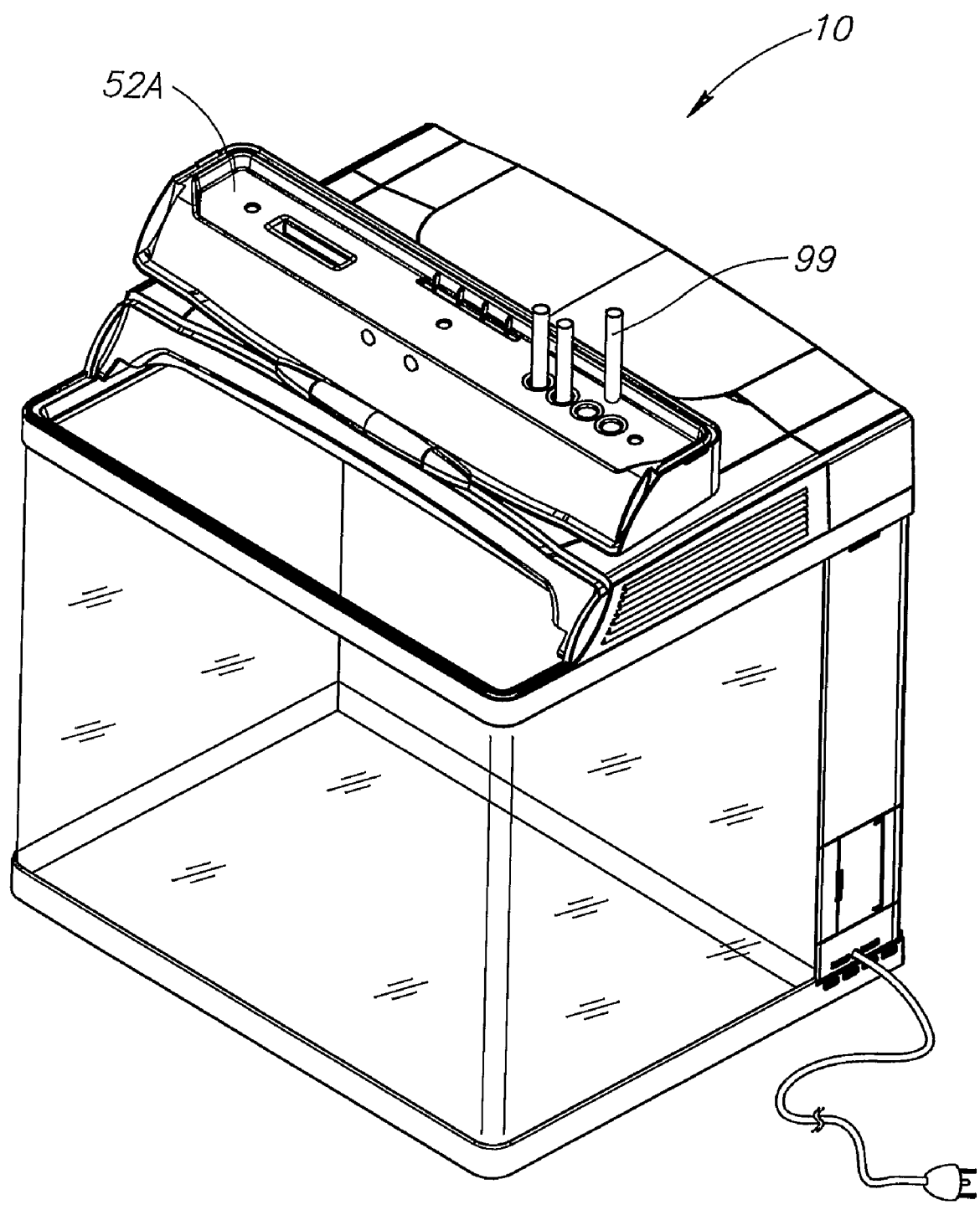
FIG. 11 is a pictorial view showing the home aquarium's hood with a full width front opening in its open position.

FIG. 11 shows the home aquarium 10 with its full width front opening 52 open for providing access to a front section of the box-like enclosure 11 for feeding and maintenance.

Figure 12:
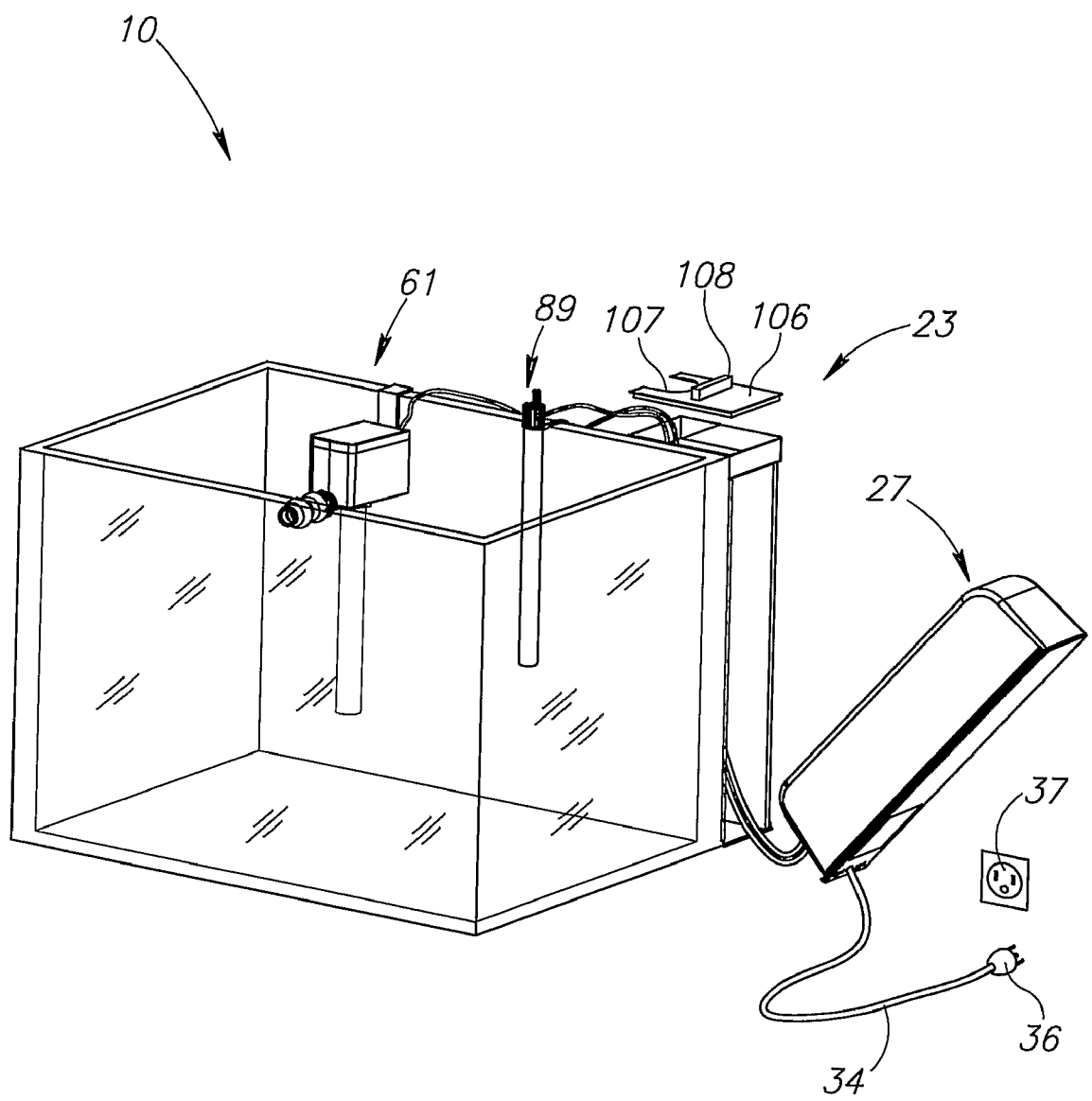
FIG. 12 is a pictorial view of a home aquarium with a splash proof power center for use with off-the-shelf electrical aquarium appliances.

FIG. 12 show a home aquarium 10 with a side compartment 23 including a below water line splash proof power center 27 for use with off-the-shelf electrical aquarium appliances. The electrical aquarium appliances can include a circulation pump 61, a heater 89, and the like. The side compartment 23 can include a cover 106 with a cutout 107 for entry of power cords thereinto, and a handle 108 for facilitating manipulation of the cover 106.

While the invention has been described with respect to a limited number of embodiments, it will be appreciated that many variations, modifications, and other applications of the invention can be made within the scope of the appended claims.

The invention claimed is:

1. A closed top home aquarium for setting up and maintaining a sea water aquatic environment, the aquarium comprising:
    (a) a transparent open topped box-like enclosure having a base, a front wall, a rear wall, a left side wall, a right side wall and an uppermost enclosure rim for housing a volume of aquarium water having a water surface with a recommended water level;
    (b) a compartment integrally formed with said box-like enclosure behind said rear wall for housing a water circulation system for circulating aquarium water from said box-like enclosure through a multistage filtration system and back into said box-like enclosure,
        said multistage filtration system being entirely housed in said compartment and including at least a mechanical filter, a protein skimmer with a skimmer pump and a manually removable foam collection cup, biological filter media and chemical filter media;
    (c) a thermostat controlled water temperature system including a water cooling fan for blowing air across the water surface for maintaining aquarium water between 24 and 28° C.;
    (d) a hinged dual position hood including a lighting system for illuminating aquarium water with a color temperature of about 10,000 degrees Kelvin for daytime illumination and moonlights for nighttime illumination, and a built-in 24 programmable timer for setting photoperiods and moonlight periods,
        said hood capable of assuming an inclined position relative to said box-like enclosure for enabling aquarist access for aquascaping the aquatic environment and maintaining said filtration system, and a closed position for closing said box-like enclosure and said compartment; and
    (e) an upright side compartment integrally formed with said box-like enclosure behind said rear wall and adjacent said compartment, said side compartment having an upright elongated aperture generally flush with one of said box-like enclosure's side walls for removable insertion of a splash proof power center therein in an upright position below said water level, a lowermost surface, and at least one drainage hole for water runoff from said side compartment,
    said power center including an electrical connection box having a series of electricity sockets in electrical connection with a single power center cord with a power center plug for plugging into a mains electricity outlet, and a splash cover for removable sealable mounting on said connection box, and a power cord access aperture for entry of power cords into said power center,
    said connection box including a base surface generally flush with said one of said box-like enclosure's side walls on insertion of said power center in said side compartment, said base surface including a cover for revealing a main control panel including a series of power switches corresponding to said series of electricity sockets,
    electrical aquarium components being plugged into said connection box prior to insertion of said power center into said side compartment with said power cord access aperture towards said lowermost surface whereupon the electrical aquarium components' power cords enter said side compartment from above, extend downwards towards said lowermost surface and loop upwards to enter said power center through said power cord access aperture thereby forming drip loops.

2. The aquarium according to claim 1 wherein at least some of said series of power switches are individually labeled with different electrical aquarium components including a circulation pump, a lighting system, a protein skimmer, and a water temperature system.

3. A home aquarium for use with off-the-shelf electrical aquarium appliances for setting up and maintaining an aquatic environment, the electrical aquarium appliances each having a power cord with an electricity plug for plugging into a mains electricity outlet, the aquarium comprising:
    (a) a transparent open topped box-like enclosure having a base, a front wall, a rear wall, a left side wall, a right side wall, and an enclosure rim, and housing a volume of aquarium water having a water surface with a recommended water level; and
    (b) an upright side compartment integrally formed with said box-like enclosure behind said rear wall and having an upright elongated aperture generally flush with one of said box-like enclosure's side walls for removable insertion of a splash proof power center therein below said water level, a lowermost surface, and at least one drainage hole for water runoff from said side compartment, said power center including an electrical connection box having a series of electricity sockets in electrical connection with a single power center cord with a power center plug for plugging into a mains electricity outlet, and a splash cover for removable sealable mounting on said connection box, and a power center access aperture for entry of power cords into said power center, said connection box including a base surface generally flush with said one of said box-like enclosure's side walls on insertion of said power center in said side compartment, said base surface including a cover for revealing a main control panel including a series of power switches corresponding to said series of electricity sockets, electrical aquarium appliances being plugged into said connection box prior to removable insertion of said power center into said side compartment with said power cord access aperture towards said lowermost surface whereupon the electrical aquarium appliances' power cords enter said side compartment from above, extend downwards towards said lowermost surface and loop upwards to enter said power center through said power cord access aperture thereby forming drip loops.

4. The aquarium according to claim 3 wherein at least some of said series of power switches are individually labeled with different electrical aquarium appliances including a circulation pump, a lighting system, a protein skimmer, and a water temperature system.

5. The aquarium according to claim 3 and further comprising a compartment integrally formed behind said box-like enclosure and adjacent said side compartment integrally formed with said box-like enclosure behind said rear wall for housing a water circulation system for circulating aquarium water from said box-like enclosure through a multistage filtration system and back into said boxlike enclosure, said multistage filtration system being entirely housed in said compartment and including at least a mechanical filter, a protein skimmer with a skimmer pump and a manually removable foam collection cup, biological filter media and chemical filter media;

a thermostat controlled water temperature system including a water cooling fan for blowing air across the water surface for maintaining aquarium water between 24 and 28° C.; and a hinged dual position hood including a lighting system for illuminating aquarium water with a color temperature of about 10,000 degrees Kelvin for daytime illumination and moonlights for nighttime illumination, and a built-in 24 programmable timer for setting photoperiods and moonlight periods, said hood capable of assuming an inclined position relative to said boxlike enclosure for enabling aquarist access for aquascaping the aquatic environment and maintaining said filtration system, and a closed position for closing said box-like enclosure to aquarist access.

6. The aquarium according to claim 5 wherein said water circulation system includes at least two circulation pumps for circulating aquarium water through said filtration system, and at least one circulation pump of said at least two circulation pumps includes an adjustable direction outlet for breaking the water surface.

7. The aquarium according to claim 5 wherein said water circulation system is capable of circulating said volume of aquarium water through said filtration system about ten times per hour and said protein skimmer is capable of filtering said volume of aquarium water about four times per hour.

8. The aquarium according to claim 5 wherein said hood includes a hinged flap capable of assuming a closed position and an open position for enabling manual removal of said foam collection cup in said hood's closed position.

9. The aquarium according to claim 5 wherein said hood includes a built-in cooling fan for cooling said hood.

10. The aquarium according to claim 5 wherein said hood includes a major rear portion and a minor front portion hinged on said rear portion for folding back onto said rear portion for enabling aquarist access to a forward section of said box-like enclosure.

* * * * *